Sept. 27, 1960        H. E. ROBERTS        2,954,085

BEAN VINE CUTTER

Filed Sept. 19, 1955                                    3 Sheets-Sheet 1

INVENTOR.
HUGH E. ROBERTS
BY Paul Blison
ATTORNEY

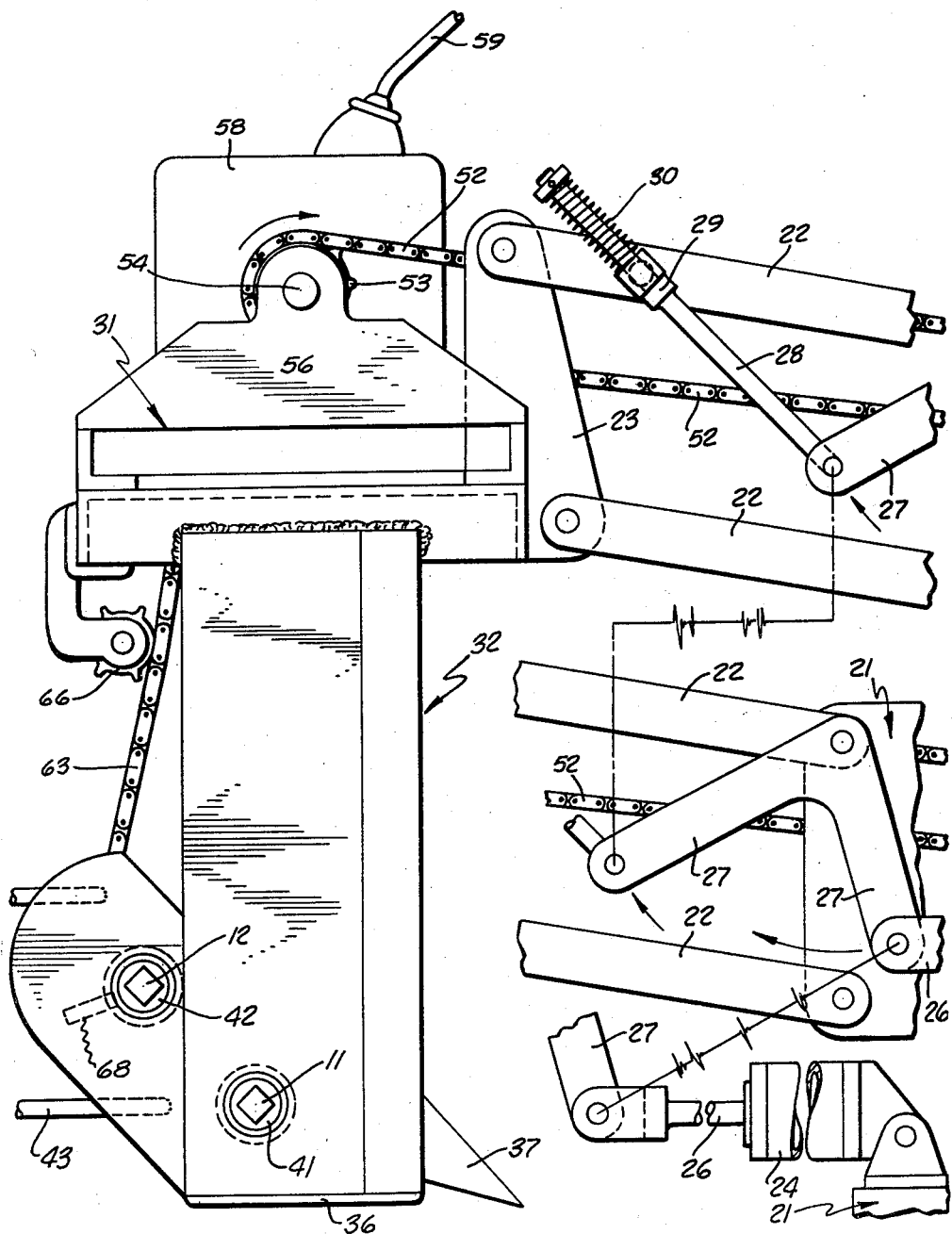

Sept. 27, 1960
H. E. ROBERTS
2,954,085
BEAN VINE CUTTER
Filed Sept. 19, 1955
3 Sheets-Sheet 3
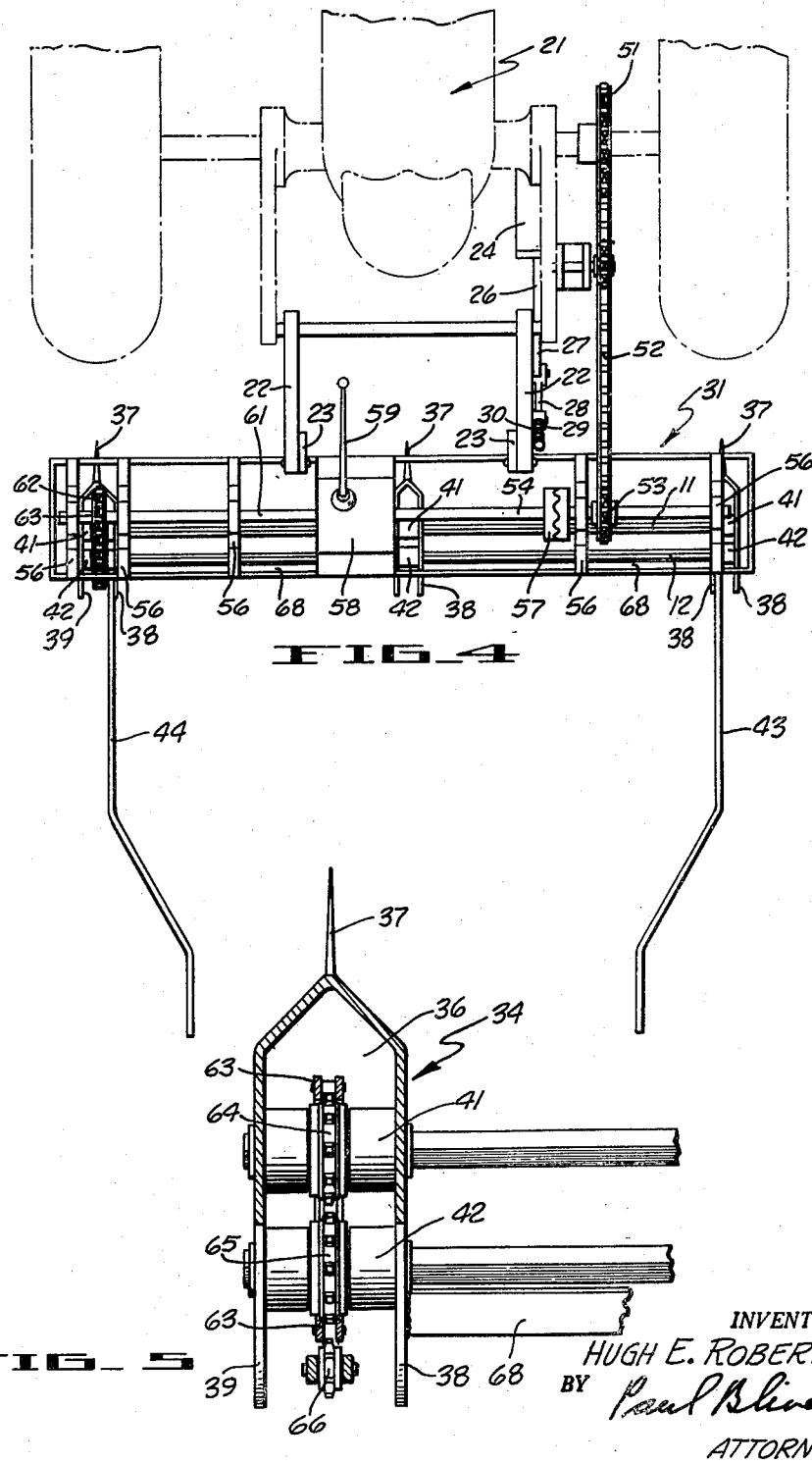

United States Patent Office 2,954,085
Patented Sept. 27, 1960

2,954,085

BEAN VINE CUTTER

Hugh E. Roberts, P.O. Box 652, Greenfield, Calif.

Filed Sept. 19, 1955, Ser. No. 535,201

3 Claims. (Cl. 172—44)

The present invention relates to a machine and to a process for severing bean vines from the soil in which they are grown.

It has been the practice when harvesting matured and dry beans to sever the bean stalk at or just below the ground surface by means of one or more fixed knife blades drawn by a tractor with the edge of the blades at an angle to the direction of movement. Such knives have not been satisfactory as they have been difficult to maintain sharp and they drag the vines to shatter the beans from the pods. Such dragging results, also, in much dirt being scraped along and being mixed with the vines so that the resulting harvest is contaminated with foreign matter.

Having in mind these defects of the prior art, it is an object of the present invention to cut bean vines by moving a cutting edge against the vine stems below the ground level with a forward and upward cutting action so that the cut vines will be lifted out of the soil.

It is an object of the present invention to give the vine cutter a rotating motion so that it will be self cleaning, both as respects the bean stem and the soil.

A further object of the present invention is that of agitating the vine stems above the ground surface so that dirt adhering thereto will be loosened therefrom and so that any dirt that may fall on the stems and vines will have an opportunity to pass between the stems to rest on the ground and not on the vines.

Another object of the present invention is that of providing a machine to carry out this process.

In achieving the present invention, applicant has constructed a machine that uses a rotating flat sided, cornered, or edged, cutter bar carried through the soil just below its surface adjacent the vine stems to sever the stems, and another similar rotating bar just above the ground surface which agitates the stems to loosen dirt therefrom and to classify or stratify the dirt and clods to lie below the stems as they fall on the ground to the rear of the passing bars. The forward edge of each bar moves upward. The spacing of the bars from each other is critical as is the rotational velocity with respect to the translational velocity.

The above mentioned defects of the prior art are remedied and these objects achieved by the construction hereinafter described in detail and shown in the accompanying drawings, in which:

Figure 1 is a schematic showing of the bars and their static and dynamic relationship to the ground and the vines being cut.

Figue 2 is, facing in the direction of travel, a right end elevational view of an embodiment of the invention.

Figure 4 is a top view thereof.

Figure 5 is a sectional view on the line 5—5 of Figure 3.

These bars, or rods, 11, 12 are here shown without indications of any supports or drive means therefor but there is shown their relative static and dynamic action, and positions with respect to each other and to a ground surface from which bean vines are to be cut.

Figure 1:
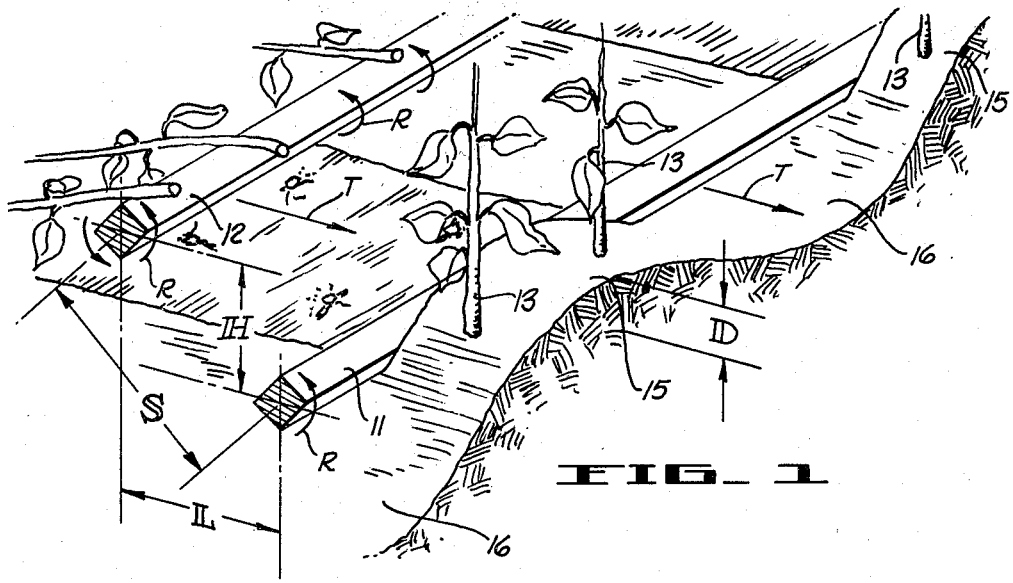
Figure 1 is a schematic showing of the bars which function directly to effect the cutting of the bean vines.
Figure 3:
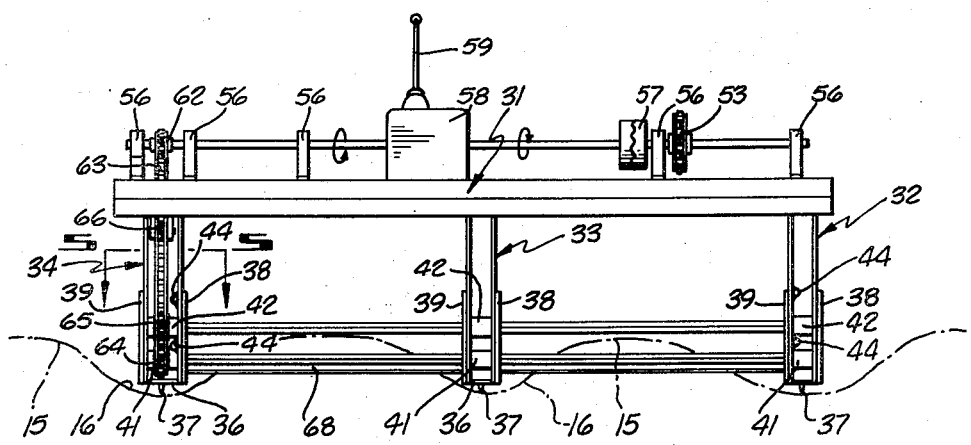
Figure 3 is a rear to front elevational view thereof.

Beans 13 are usually planted in rows. The rows may or may not be on ridges 15, and there may be one or two rows to a ridge. The bar 11 which has been shown as being below the ground surface is called the lower, or cutter, bar, and the bar 12 which has been shown as being above the ground surface is called the upper, elevator, or agitator bar. If the beans are grown on ridges, then in the operation of the bars the top of the cutter bar 11 is usually run about an inch below the top of the ridge, the distance D in Figure 1. This distance D will vary some depending on the density and friability of the ground and the curvature of the ridge. It will be deeper for loose friable ground than for stiff hard ground. For a small radius of curvature for the crown, the bar must be in the ground far enough to contact the bean vine stems about an inch and a half below the surface. When the beans are ridged, the cutter bar operates above ground between the ridges, in the irrigation furrow 16.

The bars are spaced apart about five and three-quarter inches, the distance S, with the upper bar above the lower about four inches, the distance H, and the upper bar behind the lower about four and one-eighth inches, the distance L. The upper bar may be repositioned in any direction within a half inch of that given above. Greater changes seriously affect the desired operation of the device. While the bars have been shown as having square cross-sections and the size has been seven-eighths inches square, other shapes and sizes may be used. Of course, a round bar would not cut. The bars are made of spring steel or its near equivalent. The usual cold-rolled stock is too soft. Further, the bars are rotated at about three-quarters to one and a third revolutions, R, per foot of translational movement, T. The rotational sense of the bars is as shown, the forward edge portions having an upward velocity. The above dimensions and velocities have been found to be critical for proper operation of the device. This gives a ratio of translational speed to peripheral speed of about 3.2±0.80, considering the rods to have a peripheral diameter equal to their cross sectional diagonal dimension, their maximum dimension.

If the cutter is carried deeper in the soil, it requires more power, and works in or under the root system, and does not cut the stem. If the upper bar is lowered or brought nearer the cutter, it begins to carry or shove dirt ahead of itself. If the upper bar is raised or brought forward it begins to catch and wind up the vines. Further, if raised, the large clods of earth seem to fall on top of the cut vines as they are delivered to the rear of the bars. With the given dimensions, the clods, mostly, are found under the cut vines. It is believed that these large clods are passed over the upper bar, not between the bars, and that they pass between the stems while the stems are going over the upper bar and falling to the ground. A different spacing changes this desirable operation and the clods lie on the cut vines. The upper rod feeds the vines up and to the rear, and, at the same time, due to its square section, agitates, or shakes, the vines to loosen any dirt that may adhere to them. It is probable that it is during this shaking that the clods pass between the vines and fall to the ground surface before the vines do and fall under the cut vines, so that after the machine has passed, the vines are clean and not covered or mixed with dirt. Also, changes in the above given speed ratio alters the power required and the effectiveness of the job from both the cutting and earth handling characteristics.

While many different constructional means may be used for supporting, rotating, and translating the bars in the above described relationships, the hereinafter described construction has many features found desirable. This construction is shown in Figures 2 to 5, inclusive of the drawings. The machine is adapted to be carried by and behind a tractor 21, shown in Figures 2 and 4, only in part, by a parallelogram system of pivoted links of which two 22 are pivoted to the frame of the tractor to maintain a support plate 23 normal to the general ground surface as the plate is raised and lowered by the links under the action of a hydraulic cylinder 24 pivoted to the tractor frame, its piston rod 26 connected to a bell crank 27 pivoted on the tractor frame, and an actuating link 28 having pivotal and limited sliding movement on one of the parallel links 22. The actuating link 28 is provided with a stop 29 which is effective when the link is moved by the cylinder to raise the plate 23 and a compression spring 30 placed around the link to allow the plate to be raised without action by the hydraulic cylinder as is desirable if the rods and their supports meet an obstruction. There are two spaced apart sets of the above described parallelogram across the back of the tractor but only one hydraulic cylinder and actuating linkage. Thus there are two of the support plates 23 for the support and maneuvering of the bean vine cutter. The above linkage forms no part of the present invention but is shown with parts of the tractor to illustrate the attachment of the bean vine cutter to a tractor, its relationship to such a tractor, and how the vine cutter is maneuvered.

The bean vine cutter itself will now be described. The support plates 23 are bolted to the top of a generally flat frame 31. This frame may be made of plates and angle irons as shown or otherwise fabricated. The criteria for the frame are that certain appurtenances may be secured both above and below such frame to hold them in fixed relationship. Secured to the under side of the frame 31 are a plurality of boots. In the present showing there are three such boots, 32, 33, 34. Only two boots need be used and for very large vine cutters, more than three may be used. The boots are spaced apart the distance between the ridges from which the beans are to be cut. In the present instance the outside boots 32, 34 are spaced apart eighty inches with the other boot medially thereof. These boots are of a general V-shape in horizontal section, as shown in Figure 5. The bottom of each boot may have a sole 36 for the support of the vine cutter as it operates and for easing it along the ground. A toe 37 at the lower front of each boot helps to keep the boots in the soil if such is needed and to clear away obstacles. In cutting bean vines planted in ridges, the boot soles 36 are operated on the surface of the furrow 16.

Extending rearwardly and upwardly from the heel of each boot and as a continuation of the V-shape, are a pair of wings, 38, 39. A cutter-bar bearing 41 is secured in the lower end of each boot, near the toe of the boot, just above the sole 36, and between the V-sides thereof. Between each pair of wings there is secured an agitator-bar bearing 42. The cutter bar 11 is suported by the cutter-bar bearings for rotational movement therein, and the agitator, or upper, bar 12 is supported in the agitator-bar bearings 42 for rotation therein. Extending rearwardly of the vine cutter and secured to a wing of each outside boot 32, 34, is a sweep 43, 44 which sweeps extend rearwardly and inwardly toward each other for the purpose of windrowing the cut bean vines.

The cutter bar 11 and the agitator bar 12 are given rotational movement from the power plant of the tractor by a series of chains, sprockets, shafting, and various auxiliaries thereto. Power is taken from the tractor thru a drive sprocket 51 secured to one of the rear axles of the tractor. A drive chain 52 takes power from the drive sprocket to a driven sprocket 53 secured on an input shaft 54 mounted rotationally on the upper side of the frame 31 in hangers 56. The input shaft is divided by an overload, or slip, clutch 57. The input shaft feeds into a gear box 58 which contains a throw-out clutch and a reversing gear. The throw-out clutch is operated by a handle 59, and allows the drive of the input shaft to be disconnected from or engaged with an output shaft 61. The reversing gear changes the direction of rotation of the output shaft so that it is opposite that of the input shaft. The output shaft is also rotationally bearinged in hangers 56 secured to the top of the frame 31. Above one of the boots there is secured to the output shaft 61 a bar drive sprocket 62. From this sprocket 62, a bar drive chain 63 passes downward between the V-sides of the boot. This bar drive chain passes around a cutter bar sprocket 64 and an agitator bar sprocket 65, and under a tightener sprocket 66 which is rotatably secured to the underside of the frame 31.

Placed with a downward slope in back of the upper bar 12, and secured between the opposed boot wings is a cleaner strip 68. This strip may be positioned as much as a half inch from the bar. The purpose of this strip is to prevent vines from winding on the bar as they may occasionally try to do. This strip prevents the vines from starting to wind on the bar, and, if they do, it cuts them loose as they build up on the bar. With the previousy set forth spacing of the upper and lower bars, there is little need for this cleaner strip. If such critical spacing is not used, then it becomes very necessary to use the cleaner strip to keep the vines from wrapping on the upper bar.

While the herein disclosed construction and operation of a bean vine cutter may in some of its aspects bear a relationship to prior art devices such as the rod weeders of Calkins, 2,323,452, July 6, 1943, and Kempling, 2,628,-546, February 17, 1953; and the beet loader of Walz, 2,432,956, December 16, 1947, and while applicant's lower bar may operate to cut off plants, the over-all purpose and operation is different. There is no thought of cultivation, there is no intention to mulch, or pack the soil, the upper rod is not operated in the ground, the relative location and spacing of the bars to the ground and to each other differs from this prior art.

The bean vine cutter operates well on horse, white, pinto, and black-eyed beans, specifically, and, generally, on both bush and vine type beans.

Having thus described the construction and operation of a form of my invention, I claim:

1. A bean vine cutter, comprising: an elongated frame, means for attaching such frame to and across a tractor and for raising and lowering said frame, boots depending from and secured to said frame, each of said boots having a toe and a heel portion remote from said frame, a pair of bars rotatably supported in said boots remote from said frame, said bars being parallel to each other and one of them being near the toes of said boots and the other in the heels of said boots behind and above the one about four inches, and means for rotating said bars as said tractor travels forward so that the ratio of travel to peripheral speed of said one bar is about 3.2±0.80.

2. The combination of claim 1 in which said means for rotating said bars is contained in a said boot.

3. A bean vine cutter, comprising: an upper and a lower polygonal bar; means for supporting said bars for translational movement in a sensed direction taken in the general surface of the ground from which such vines are to be cut with said bars parallel to such surface, the lower bar just below such surface, the upper bar above such surface, and the upper bar in the sensed direction behind the lower bar; means for rotating said bars in the same direction; and, supported by said means for supporting, a cleaner strip parallel to, adjacent to, substantially coextensive with, and behind said upper bar.

References Cited in the file of this patent

UNITED STATES PATENTS

| | | |
|---|---|---|
| 1,877,652 | Erwin | Sept. 13, 1932 |
| 2,197,316 | Prickett | Apr. 16, 1940 |
| 2,299,522 | Calkins | Oct. 20, 1942 |
| 2,323,452 | Calkins et al. | July 6, 1943 |
| 2,432,956 | Walz et al. | Dec. 16, 1947 |
| 2,628,546 | Kempling | Feb. 17, 1953 |
| 2,718,110 | Butler | Sept. 20, 1955 |